Dec. 12, 1933.    R. T. MEYER    1,938,923
GASOLINE DISPENSING PUMP
Filed July 26, 1932
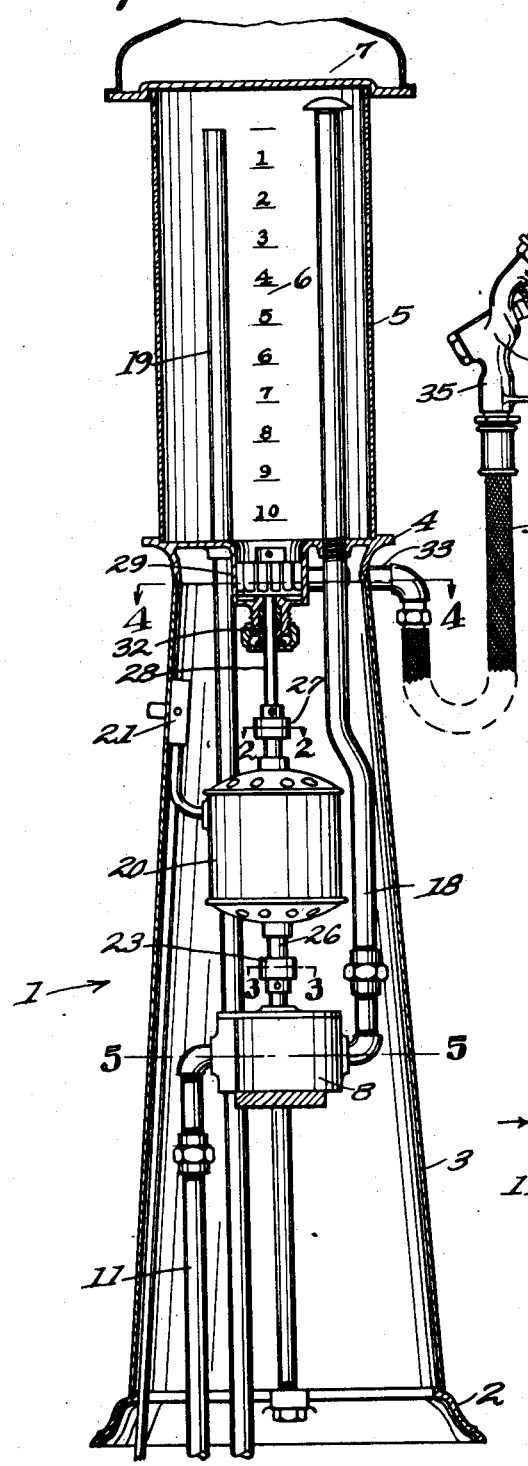
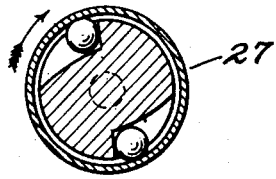
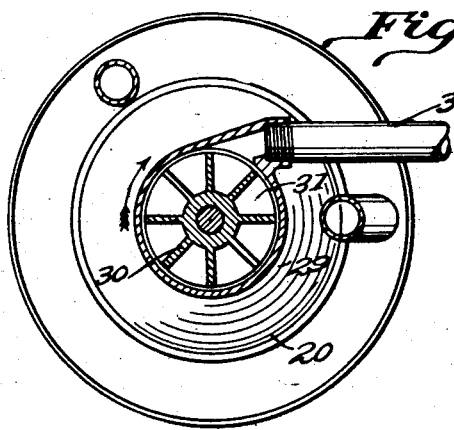
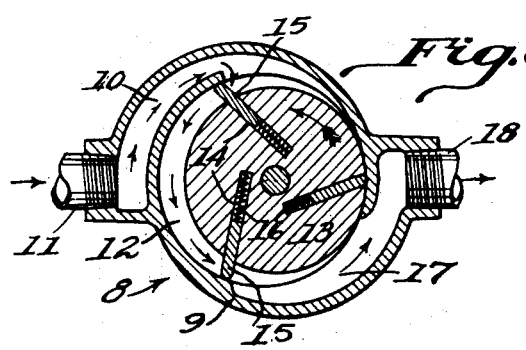
Inventor
R. T. Meyer
H. S. M<sup>c</sup>Dowell
By
Attorney Patented Dec. 12, 1933

1,938,923

UNITED STATES PATENT OFFICE 1,938,923

GASOLINE DISPENSING PUMP

Richard T. Meyer, Chicago, Ill., assignor to The Pure Oil Company, Chicago, Ill., a corporation of Ohio Application July 26, 1932. Serial No. 624,787

9 Claims. (Cl. 221—100)

This invention relates to improvements in motor fuel measuring and dispensing apparatus and has particular reference to the so-called visible type of pumping apparatus employed in effecting a measured delivery of liquid motor fuels from storage receptacles into the fuel tanks of motor vehicles.

The usual visible type of motor fuel dispensing pump provides an elevated frame structure upon the upper portion of which is mounted a transparent walled measuring container, pump means being provided for elevating the liquid fuel from an underground storage tank to the container for the purpose of filling the latter to a desired level with the motor fuel, the transparent walls of the container permitting the liquid received within the container to be exteriorly observed, whereby to permit of visual determination of the quality of liquor withdrawn from the container and the quality or appearance thereof noted.

In the ordinary form of dispensing pump of this type, the liquid is drained from the container through the flexible discharge line by gravity, with the result that the operation of the pump is relatively slow and also difficulty is encountered in delivering the liquid to motor vehicles having relatively elevated fuel tanks, such as are encountered in many trucks, buses or other large type motor vehicles.

It is an object of the present invention to provide improved means in a visible type of dispensing pump, wherein the liquid is positively discharged or withdrawn from the graduated transparent walled measuring container under pump pressures in order that the apparatus may be operated with rapidity and successive measured deliveries of liquid made therefrom in periods of short duration.

In my co-pending application, Serial No. 624,786 filed July 26, 1932, I have set forth liquid measuring and dispensing apparatus for accomplishing this purpose through the employment of a reversible pump unit wherein the single unit functions in the dual capacity of elevating the liquid from an underground storage tank to the visible measuring container and effecting the forced discharge of the liquid from said container through the flexible discharge line of the apparatus.

In accordance with the present invention, the construction for accomplishing this result is simplified by the utilization of separate pumps, one for elevating the liquid to the container and the other for effecting the discharge of the liquid from the container.

A further object of the invention resides in the provision of a single reversible electric motor for effecting the operation of both of the pump units, the drive shaft of the motor being provided with drive clutches so formed that when the motor is operated in one direction, one of said pumps will be driven and the other released and vice versa, the said motor being under the control of the manually operated switch by which the operation of the pumps may be selectively controlled.

With these and other objects in view, which will appear as the description proceeds, the invention consists in the novel features of construction, combination of elements and arrangements of parts hereinafter fully described and pointed out in the appended claims.

In the accompanying drawing:

Fig. 1 is a view in vertical cross section of the liquid measuring and dispensing apparatus comprising the present invention;

Fig. 2 is a detail horizontal cross sectional view taken through the drive clutch for the container pump, the plane of the view being indicated by the line 2—2 of Fig. 1;

Fig. 3 is a similar view through the other drive clutch on the line 3—3 of Fig. 1;

Fig. 4 is a horizontal sectional view taken through the container pump on the line 4—4 of Fig. 1;

Fig. 5 is a horizontal sectional view through the elevating pump on the line 5—5 of Fig. 1.

In the specific embodiment of my invention illustrated in the drawing, the numeral 1 designates a suitable form of supporting frame which in this instance comprises a base casting 2, an upright tubular casing 3 having slightly tapering walls and a top casting 4, which constitutes the base for the transparent walled measuring container 5, the walls of said container being graduated as at 6 to indicate units of liquid measurement. The upper end of the container is closed by a bonnet 7.

In order to elevate liquid from an underground storage tank (not shown) to the container 5, in order to fill the latter to a desired level with the liquid to be dispensed, use is made of a rotary pump indicated at 8. This pump may be one of several different types but in the form herein selected for illustration, the same comprises a casing 9 provided with an inlet chamber 10, the latter being disposed in communication with a vertical transfer pipe 11 used in conducting the liquid from the underground tank, or other source of supply, to the pump.

The inlet chamber 10 communicates with a circular pumping chamber 12 in which is eccentrically mounted a rotor 13, the latter being formed with tangentially disposed slots 14 in which are positioned spring pressed vanes 15, which are forced outwardly by the springs 16 so that the outer edges of the vanes frictionally engage with the inner walls of the chamber 12. It will be seen that when the rotor revolves, as indicated by the arrows in Fig. 5, liquid will be drawn through the pipe 11, the inlet chamber 10, thence forced through the rotor chamber 12 and into the communicating discharge chamber 17. A vertical transfer pipe 18 has its lower end in communication with the chamber 17 and extends upwardly through the casting 4 and terminates near the top of the container 5 in order to fill the latter to the desired level with liquid. The container is provided with an overflow pipe 19 which extends downwardly through the supporting frame to the storage tank, and thereby limits the quantity of liquid receivable within the container 5.

To operate the pump 8, I employ a reversible electric motor 20 which is suitably supported within the frame 1 and the operation of the motor is governed by a manually controlled switch 21, accessible from the exterior of the casing 3. The lower end of the armature shaft of the motor carries a cam member 22, which comprises the driving element of a clutch 23. This cam member includes peripheral recesses in which are positioned ball members 24, the latter being retained within the cam shaped recesses by a circular sleeve 25 carried by the upper end of the pump shaft 26, the lower end of said shaft being connected with the rotor 13. By the use of this type of clutch, it will be seen that when the motor is operated in the direction indicated by the arrows in Figs. 3 and 5, the cam shaped recess in the member 22 will wedge the ball members 24 into frictional driving contact with the sleeve 25, thus causing the movement of the rotor in unison with the armature shaft of the motor 20. In the event the direction of rotation of the motor is reversed, the ball members 24 are released and allowed to occupy the larger portion of the recesses in the cam member 22 so that the drive to the pump 8 is interrupted and said pump allowed to remain idle.

A similar type of ball clutch 27 unites the upper end of the armature shaft of the motor 20 with the drive shaft 28 of the container pump 29. The clutch 27 however is so arranged that it will drive the pump 29 when the pump 8 is idle and vice versa. The pump 29 provides a rotor 30 formed with radial blades and mounted for rotation in a chamber 31 formed in the axial portion of the casting 4, the shaft 28 passing through a stuffing box 32. The chamber 31 is in communication with a discharge pipe 33 leading to the exterior of the casing 3, and to the outer end of this discharge pipe there is connected the usual flexible conduit or hose 34 by which the liquid forced from the container by the operation of the pump 29 may be conveniently delivered to a desired point of discharge. The outer end of the hose 34 is equipped with the usual nozzle 35 provided with a manually controlled valve 36.

In the operation of the pumping apparatus, assuming that the container 5 is empty, the switch 21 is operated so that the motor 20 will be energized to rotate in a direction to operate the pump 8, which rapidly fills the container with liquid, drawn from the source of supply, to its capacity or other desired level. When this level has been reached, the switch mechanism may be operated to stop the motor or if the liquid is to be discharged from the container, the switch mechanism is then positioned to excite the motor in a direction operating the pump 29. In the event the pump 29 is in operation with the valve 36 closed, the construction of the pump 29 is such as to provide for its own relief without injury to its moving parts, there being no need to provide a by-pass control. In the filling of the tank of a motor vehicle, with the pump 29 in motion, it is merely necessary to open the valve 36 which then provides for the positive movement under pump pressures of the liquid from the container through the discharge hose and into the vehicle tank. The operator by noting the descent of the liquid in reference to the graduations 6 on the container may know at any time the quantity of liquid so dispensed. After the desired amount of liquid has been delivered, the valve 36 is closed by releasing pressure on the trigger 37 and the switch 21 is moved to a neutral position.

In view of the foregoing, it will be seen that the present invention provides readily controlled apparatus for effecting the discharge of liquid from the visible container of a measuring pump under positively applied pressures. The apparatus is extremely simple to control, consists of but few operating parts and is not likely to become readily out of order or require any undue attention in maintaining the same in proper operating condition. By providing the positive discharge of liquid from the container, instead of relying upon gravity, the height of the pump may be considerably lowered as compared with the usual type of visible pump, so that the container may be positioned at such a height that it may be readily viewed both by the customer and the pump operator. This enables withdrawal of liquid from the container to be under convenient and accurate observation and also enables the appearance of the liquid so dispensed to be conveniently noted.

While I have described what I consider to be the preferred embodiments of my invention, nevertheless it will be understood that I do not limit myself to the exact details of construction and operation above set forth, but reserve the right to employ variations or modifications thereof without departing from the spirit of the invention as the latter has been defined in the following claims.

What is claimed is:

1. In fluid measuring and dispensing apparatus, a supporting frame, a measuring container provided with transparent walls supported by the upper end of said frame, a reversible electric motor mounted within said frame below said container, an elevating pump operable upon the rotation of said motor in one direction to effect the elevation of liquid from a source of supply to said container, an overflow pipe leading from said container to said source of supply for limiting the amount of liquid receivable within said container, a second pump communicating with the bottom of said container and operable when the motor is rotating in the reverse direction from that employed in operating the elevating pump to transfer liquid under pressure from said container through a discharge line, and a valved nozzle carried by the outer end of said discharge line.

2. In fluid measuring and dispensing apparatus, a supporting frame, a measuring container provided with transparent walls mounted on the upper portion of said frame, a valved discharge line leading from the bottom of said container, a reversible electric motor arranged within said frame below said container, and pumps selectively operable by the direction of rotation of said motor for delivering liquid to and discharging the same from said container.

3. A motor fuel measuring and dispensing apparatus, a supporting frame, a measuring container supported upon the upper portion of said frame, a valved discharge line leading from the bottom of said container, a reversible electric motor arranged within said frame below said container, and pumps selectively operable by the direction of rotation of said motor for delivering liquid to and discharging the same from said container.

4. In apparatus for measuring and dispensing motor fuels, a supporting frame, a measuring container mounted upon the upper end of said frame, a pump for transferring liquid from a source of supply to said container, an overflow pipe disposed in said container for limiting the quantity of liquid receivable therein, a valved discharge line leading from said container, a pump for effecting the forced passage of liquid from said container through said discharge line, and means for selectively operating said pumps.

5. In liquid measuring and dispensing apparatus, a supporting frame, a transparent walled measuring container supported upon the upper portion of said frame, a reversible electric motor carried by said frame below said container, a rotary elevating pump, motion transmitting means connecting the drive shafts of said motor and pump and operable to effect the operation of said pump when said motor is revolving in but one direction whereby to transfer liquid from a source of supply to said container, a valved discharge line leading from said container, a pump communicating with said discharge line for effecting the forced passage of liquid therethrough, and a coupling uniting the shaft of said motor with that of said last-named pump admitting of the operation of said last-named pump when said motor is rotating in a direction opposed to that employed in operating the first-named pump.

6. In liquid measuring and dispensing apparatus, a measuring container, a rotary pump operable in one direction for filling said container, a second rotary pump operable in the opposite direction to empty said container, and means for selectively operating said pumps.

7. In liquid measuring and dispensing apparatus, a measuring container, a rotary pump for filling said container, a second rotary pump arranged in the bottom of said container and operable to empty same, a motor for driving said pumps, and means for selectively operating said pumps.

8. In liquid measuring and dispensing apparatus, a measuring container, a pump for filling said container, a second pump for emptying said container, a reversible motor for driving said pumps, a single direction clutch between the first mentioned pump and the motor, an opposite direction clutch between the second pump and the motor and means for reversing the direction of rotation of the motor.

9. In liquid measuring and dispensing apparatus, a frame, a measuring container carried by said frame, a supply line leading to said container, a pump in said supply line, a valved delivery line leading from said container, a second pump in said delivery line, a motor for operating said pumps, and means for operating either of said pumps independently of the other.

RICHARD T. MEYER.